June 16, 1936.  J. RÜCKERT  2,044,402
PRODUCTION OF SHUTTLES
Original Filed Aug. 6, 1932   3 Sheets-Sheet 1
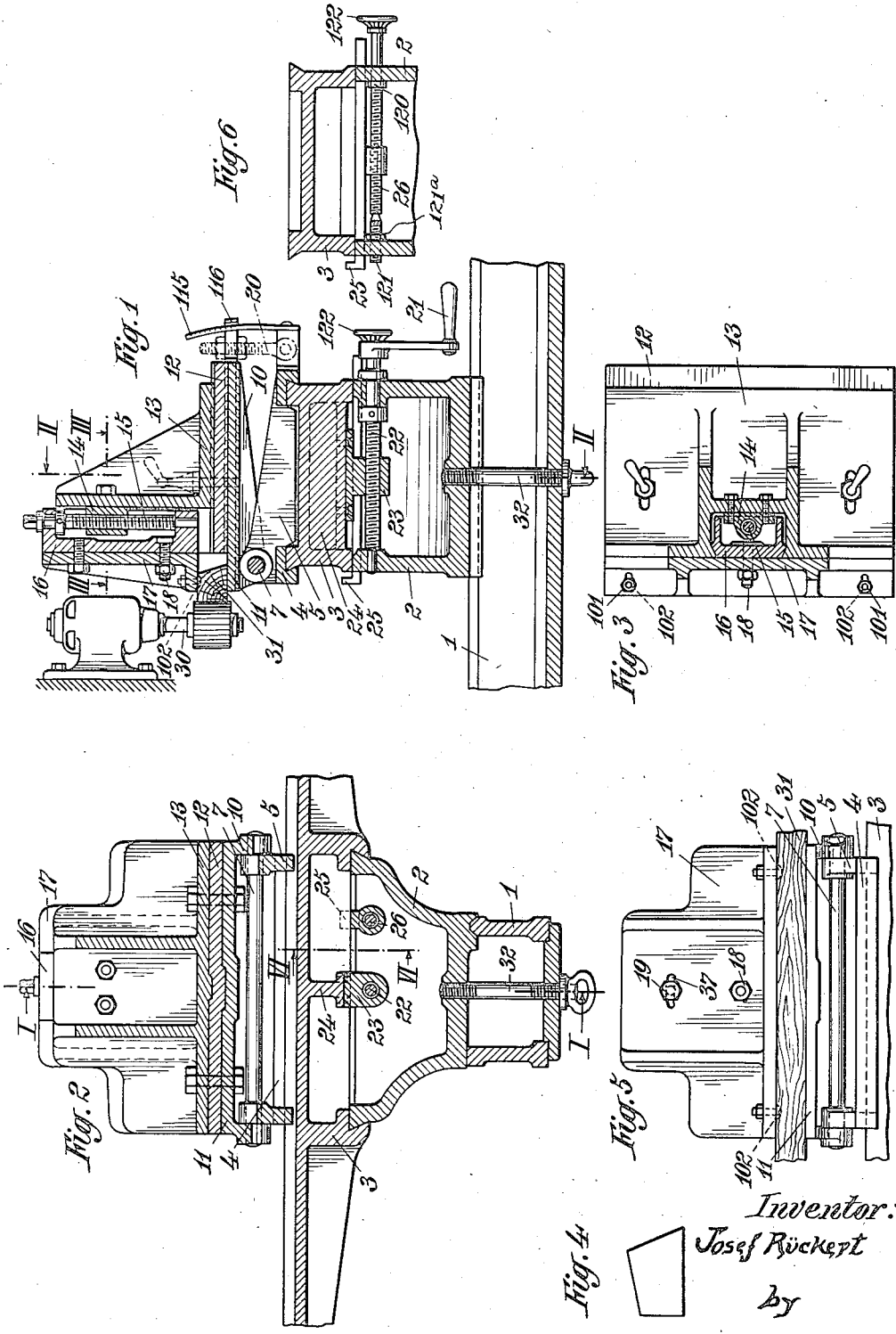
Inventor:
Josef Rückert
by
Howard A. Coombs, Atty.

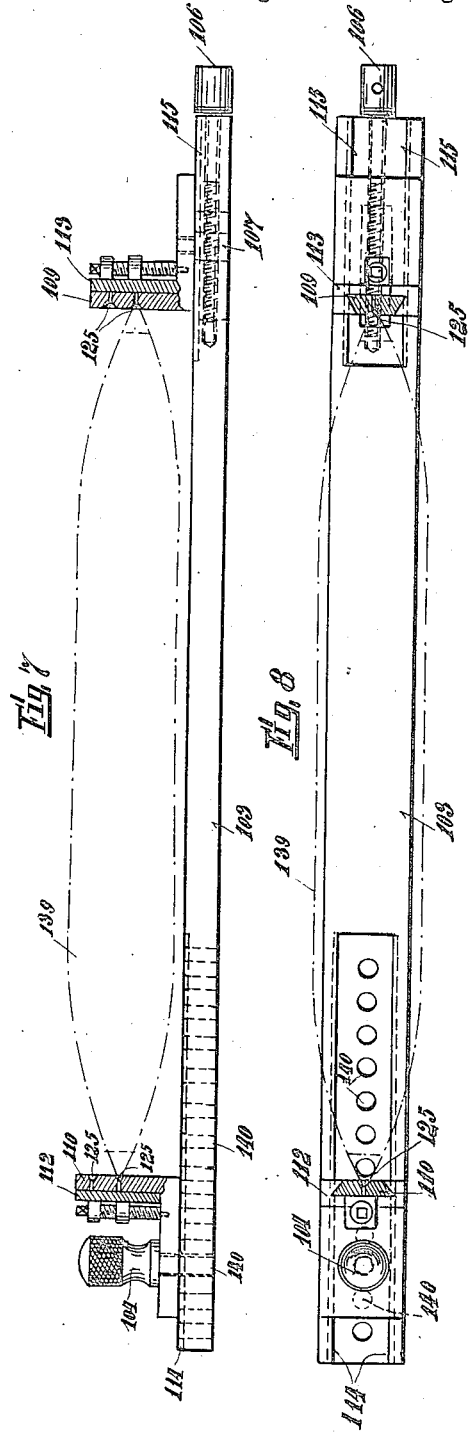

June 16, 1936. J. RÜCKERT 2,044,402
PRODUCTION OF SHUTTLES
Original Filed Aug. 6, 1932   3 Sheets-Sheet 3
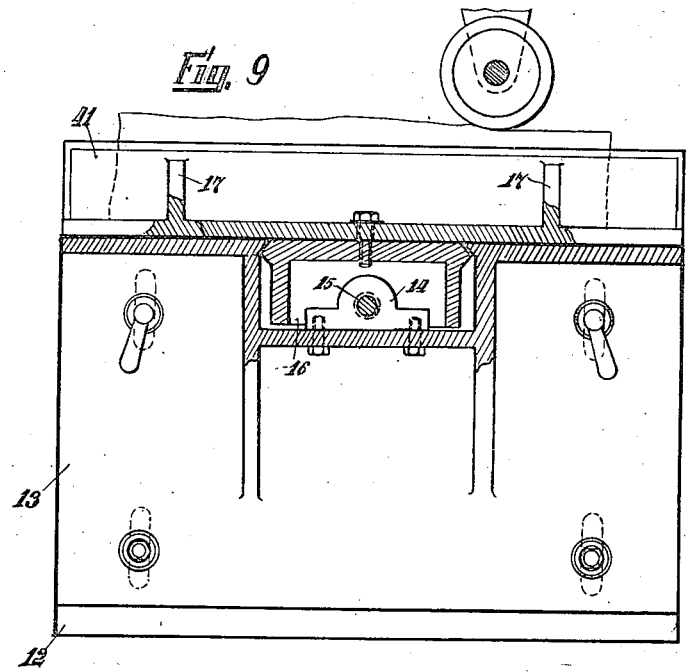
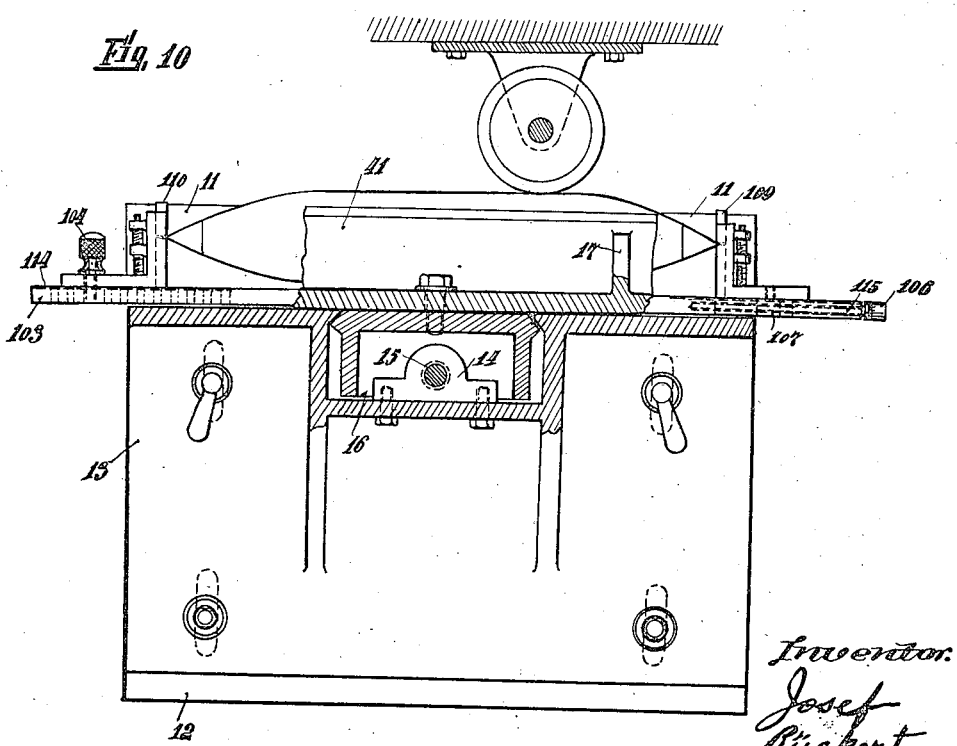
Inventor.
Josef Rückert
by Howard A. Combs Patented June 16, 1936

2,044,402

UNITED STATES PATENT OFFICE 2,044,402

PRODUCTION OF SHUTTLES

Josef Rückert, Zuckmantel, Czechoslovakia

Application August 6, 1932, Serial No. 627,801.
Renewed January 16, 1936. In Czechoslovakia
May 5, 1932

4 Claims. (Cl. 144—2)

This invention relates to an improved device for producing weavers' shuttles and for trimming worn shuttles.

In the manufacture of weavers' shuttles particular attention must be paid to the fact that the lateral surfaces of the shuttles must not only be parallel but their angular position in relation to each other must accurately comply with the requirements of the loom in which they are intended to be used. If these requirements are not strictly adhered to, difficulties will immediately arise with regard to the satisfactory running of the shuttle in the loom, which will be augmented as the number of shuttles used increases. It is likewise of great importance that each shuttle should be picked to the same extent, because the slightest deviation from this rule will result in the shuttle flying out.

It is still necessary to resort to manual methods in the production of shuttles from rough blocks. Although it has already been proposed to provide devices for trimming worn shuttles, in which the said shuttles are clamped between the centres of a support only and are thus moved along in front of a tool, this method is defective because the clamping requires a strong axial pressure to be exerted upon the shuttle, the walls of which are usually very thin. This is conducive to deformations of the walls and renders uniform machining impossible.

The object of the present invention is to provide a device wherein the defects above referred to are eliminated and the clamping is effected quickly and in a very simple manner, and wherein it is possible to machine rough blocks, as well as to trim used and worn shuttles, in such a manner that the required inclination of the edges of the shuttle and a perfectly uniform machining of each edge are obtained with great accuracy.

In the new device, in the first place, the known support is used, wherein the rough blocks, or the worn shuttles to be trimmed, are clamped for the purpose of feeding them along in front of a tool, such as a milling cutter. According to the invention, such support carries a clamping device, comprising a base plate rotatable about a horizontal axis, and a clamping bracket with adjustable clamping jaw, between which is disposed an adjusting plate. Said adjusting plate is adjustable according to the width of the shuttle in question. The clamping device, as a whole, is rockable about a horizontal axis and its inclination to the horizontal is adjustable, for example by means of a micrometer screw. The lateral movement of the auxiliary slide carrying the clamping device may be limited by means of a stop operated by a threaded spindle.

Furthermore, the clamping device is so arranged that the upper vertically displaceable clamping jaw may be rocked about a horizontal axis disposed on the slide and adapted to securely clamp rough blocks, the edges of which are not parallel to each other. This arrangement is also very useful for clamping shuttles which are to be trimmed.

The auxiliary device, which is utilized in connection with the device described above for trimming worn shuttles, comprises a separate adjusting member, preferably in the form of a metal rail which is provided with angular pieces, having adjustable support like slides, in which centres or points are arranged for receiving the points of the shuttles. By means of this device, the axis of the shuttle to be trimmed is so adjusted that it is parallel to the steel rail, whether both points of the shuttle lie in the axis of the shuttle or not. Thereupon the steel rail is placed upon the above described adjusting plate, so that the clamping of the shuttle may be effected in the same way as that of the rough blocks, the opposite edges being supported on the whole surface. The shuttle to be machined is, however, not clamped into this adjusting member under the application of axial pressure, but is placed therein in a comparatively loose manner.

In order that the invention may be more clearly understood, one particular construction thereof will now be described with reference to the accompanying drawings wherein:—

Fig. 1 is a vertical section of the clamping means on line I—I of Fig. 2;

Fig. 2 is a longitudinal section of the same on line II—II of Fig. 1;

Fig. 3 is a sectional view taken on line III—III of Fig. 1;

Fig. 4 is a cross sectional view of a weaver's shuttle, wherein the angles in question have been shown on a larger scale;

Fig. 5 is a front elevation of the clamping jaw for the means shown in Figs. 1 and 2;

Fig. 6 shows in detail the stop which limits the feeding of the auxiliary slide carrying the clamping device towards the tool according to line VI—VI in Fig. 2.

Fig. 7 is a front view of the auxiliary device used in trimming worn shuttles,

Fig. 8 is a plan view thereof,

Fig. 9 is a sectional view showing the cutter as operating on a rough block, and Fig. 10 is a similar view showing the cutter as trimming a worn shuttle.

In the drawings, 1 indicates a lathe bed, 2 a slide which is slidable on the bed and rigidly connectable with it, as by a screw 32, 3 an auxiliary slide which is slidable on the slide 2 parallel to the bed by means of crank 21, threaded spindle 22 and nut 23, which is connected to rib 24 of the auxiliary slide 3. The auxiliary slide 3 serves for the fine adjustment, while slide 2 is utilized for coarse adjustment. The auxiliary slide 3 is provided with laterally protruding arms (Fig. 2), and on its upper part is provided with a slideway upon which the slide 4 slides transversely to the lathe bed. The slide 4 is provided with upright ribs 5, in which is mounted the shaft 7, on which can be rocked the base plate 11, having ribs 10, of the clamping device hereinafter described. On the adjusting plate 12 is mounted the bracket 13, which carries the clamping device. As will be seen in Fig. 2, the bracket 13, adjusting plate 12 and base plate 11 are provided with keys and keyways to ensure accurate centering and guiding. As will be seen in Fig. 2, the said three members 11, 12 and 13 are held together by screws. The adjusting plate 12 is provided with slots for adjustment purposes. Rigidly connected to bracket 13 is a nut 14 with which engages a threaded spindle 15 securely mounted in slide member 16, which, as shown in Fig. 3, is guided by the nut 14 along bracket 13. Secured to slide member 16 by screws 18 and 19 is a clamping jaw 17. Since the nut 14 is securely connected to bracket 13, the spindle 15 will move upwards or downwards according to the direction of rotation and, together with it, will move the slide member 16, as well as the clamping jaw 17. As will be seen in Fig. 5, the clamping jaw 17 is provided with a curved slot 37 for the screw 19, so that it may be rocked laterally if the wood 31 to be machined is not of uniform thickness. The base plate 11, together with the whole clamping mechanism, may be adjusted at various angles by means of the screw 20 and the scale 115. The cutting device is shown diagrammatically at 30 in Fig. 1.

The upper clamping jaw 17 carries forwardly displaceable lugs 102, which are used when machining the first two edges of rough blocks and enable the said blocks to be securely held even if the spindle 15 is only lightly tightened.

On the slide 2, Fig. 6, a stop 25 is mounted to limit the feeding movement of the slide 3, which is slidable longitudinally of slide 2. This stop 25 can be adjusted by means of a spindle 26, which carries a collar 120, and only the shaft of the spindle 26 extends through the wall of the slide and there it carries a knob 122, adapted to be turned by hand. The other end of the spindle 26 is secured by a screw 121 and a counter nut 121a and, by this clamping of the spindle in the slide 2, which is easily readjusted when worn, end play is entirely eliminated. The device operates as follows:

When machining rough blocks, the adjusting plate 12 is first of all moved forward to such an extent that the block protrudes slightly over the clamping device. Thereupon the tilting device is rocked about the shaft 7 until the base plate 11 is horizontal and stands at right angles to the vertically operating milling spindle.

The two lugs 102, of which only one is shown in Fig. 1, are pressed to the surface of the rough block, which is placed between the base plate 11 and the clamping jaw 17 by tightening the spindle 15; then first the side intended for the bottom of the shuttle is machined by the cutter shown diagrammatically in Fig. 1. In this way, preferably, a number of shuttle blocks are machined while the adjustment of the clamping device remains unaltered. Thereupon the adjusting plate 12 is adjusted according to the width of the shuttle blocks and by means of the micrometer screw 20, the pointer 116 and the scale 115, the desired inclination of the whole device is obtained in accordance with the inclination of the front wall of the shuttle. If desired, the two lugs 102 are also adjusted to a position over the axis of the work and then the front wall is machined. Before the back wall is machined, the lugs 102 are removed and, as described above, the adjusting plate 12 is set at the proper angle for the back wall of the shuttle. As soon as the first back wall has been trimmed, the stop 25 is accurately adjusted in accordance with the desired width of the bottom so that the movement of the slide in the direction towards the cutter is limited, while the shuttle block is somewhat removed from the milling head by rotation of the crank 21. When the shuttle block is removed, the slide 3 is again moved against the stop 25 by turning the crank 21 in the reverse direction. Thus all the blocks so far machined will be of exactly the same width. The process is repeated in a suitable manner for the surface of the block.

The auxiliary device, shown in Figs. 7 and 8, makes it possible to clamp in shuttles with non-uniformly worn walls and those the points of which do not lie in the same axis, in such a manner that the worn edges may be machined in the proper way. This device comprises a steel rail 103, see Fig. 10, on which are mounted angle members 112 and 113, having adjustable slides 109 and 110 provided with centers or holes 125. The shuttle 139, see Fig. 7, is placed between said angle members, the slides, if necessary, being suitably adjusted in such a manner that the shuttle axis is parallel to the steel rail 103. The latter is then placed along the adjusting plate 12 upon the base plate 11 and then the shuttle is clamped in by means of the jaw 17, in readiness for the machining. The rail 103 is provided on one side with a guide 114, in which the angle member 112 is slidable. Said member may be screwed fast in holes 140 in the rail by means of the set screw 104. Member 113 has a guide 115 on the other side of the rail, whereby it is possible to obtain a fine adjustment of the angular member 113 by means of the screw 106 and nut 107. When machining worn shuttles, especially such wherein the points are not in the axis, the auxiliary device will, of course, be used for machining the bottom and the front side only, for when the remaining surfaces are machined, regularly formed flat surfaces will already be available for use.

Having thus described my invention, what I claim is:

1. Work support to be used on a machine for forming shuttles and for trimming worn shuttles consisting of a slidable work support and a clamping device on said support, said support consisting of a base plate rockable about a horizontal axis and said device consisting of a clamping bracket having an adjustable clamping jaw and an adjustable work-locating plate and means for securing or clamping together the base plate, the clamping bracket and the adjustable plate.

2. In the machine of claim 1, an auxiliary slide, carrying the clamping device towards the cutter, being limited by means of a stop mounted on the main slide and being adjustable by means of a threaded spindle.

3. A device in accordance with claim 1, and a micrometer screw for rocking said support and the clamping device thereon.

4. A device in accordance with claim 1, in which the clamping jaw is mounted on a slide adjustable vertically by means of a threaded spindle and is rockable about a horizontal axis in said slidable work support, so that the inclination of its clamping surface may be adjusted to the inclination of the edge of the work contacting therewith.

JOSEF RÜCKERT.